May 30, 1944. S. ZUCKERMAN 2,350,268
ARTIFICIAL FLOWER HOLDER
Filed March 13, 1942
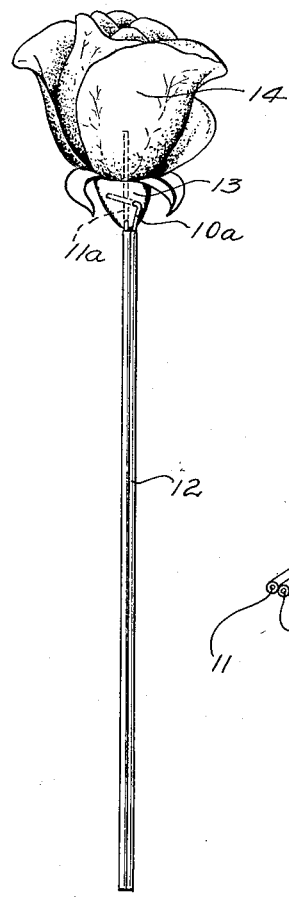
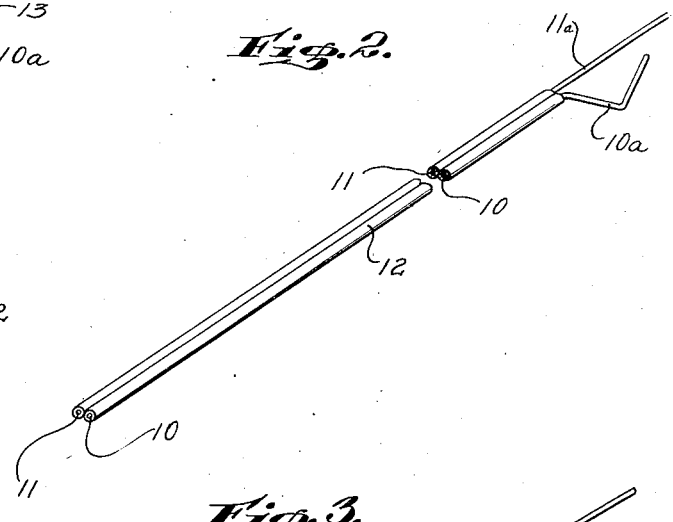
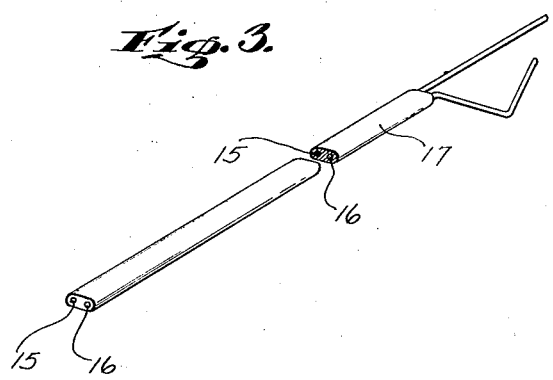
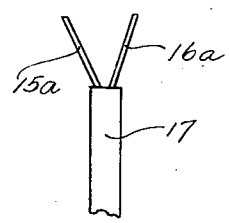
INVENTOR
Samuel Zuckerman
BY
H. H. Golden
ATTORNEY Patented May 30, 1944

2,350,268

UNITED STATES PATENT OFFICE 2,350,268

ARTIFICIAL FLOWER HOLDER

Samuel Zuckerman, New York, N. Y.

Application March 13, 1942, Serial No. 434,461

2 Claims. (Cl. 47—55)

This invention relates to a flower holder to be used in the making of corsages, wreaths and other decorative assemblies of natural flowers. More particularly, my invention relates to a flower holder of the class illustrated in the Albany Patent No. 1,769,198 granted July 1, 1930.

In that patent, there is illustrated a flower holder comprising two or more wires, the ends of which are adapted for insertion in the calyx of the flower, the wires themselves being held together by the twisting of the wires relatively to one another. Those skilled in the art will readily appreciate that this type of flower holder requires means for covering the wires, and to prevent the lower ends of the wires from injuring the persons who may be handling the flowers mounted on the flower holder.

My invention contributes to the art a novel form of flower holder in which two or more wires may be used for insertion into the calyx of a flower, with those portions of the wires outside the calyx held assembled by a plastic coating material which gives the wires the appearance of a natural flower stem. In addition, the plastic coating acts to cover the ends of the wires, whereby to protect those handling the flowers. The plastic coating which I prefer to utilize may be of any commercial composition so long as it is readily yieldable to permit bending of the wires which it covers, and so long as it has sufficient strength to hold the wires assembled to simulate a natural flower stem. A material that I have used is manufactured by Freydberg Bros.-Strauss, Inc., of Stamford, Connecticut, and is sold under the trade-mark "Cotawire."

Referring now to the drawing, Fig. 1 is an elevation showing a flower secured to my flower holder. Fig. 2 is a perspective view of the flower holder of Fig. 1 with a portion thereof shown in section. Fig. 3 is a view similar to Fig. 2 showing a modified form of flower holder. Fig. 4 is an elevation showing the use of a flower holder such as that in Fig. 3, with the wires protruding in a V form.

Referring now more particularly to the drawing, and especially Figs. 1 and 2, I show a flower holder formed of wires 10 and 11 which are coated with a suitable plastic coating that holds the wires in assembled relation, with the ends of the wires extending beyond the coated portion as indicated by reference numerals 10a and 11a. The coating 12 may be of any suitable plastic composition as has already been indicated generally, and in the form of my invention illustrated in Fig. 2, yields a holder whose cross section is substantially figure 8 in form. As illustrated in Fig. 1 the ends 10a and 11a of the two wires 10 and 11 are adapted for insertion into the calyx 13 of a flower 14. The resulting assembly is a flower having a stem which simulates a natural stem in appearance, and which has all the qualities of a wire stem.

In manufacturing my flower holder, I shall probably use a continuous length of the coated wire assembly, and shall cut this continuous length into short lengths. From each short length, there will be removed a portion of the coating, to leave exposed wire such as designated by reference numerals 10a and 11a. However, those skilled in the art will understand that my novel flower holder may be manufactured in numerous other ways, and that my patent claims must not be limited to the particular method of manufacture here outlined.

In Fig. 3 I illustrate a modified form of my invention in which the wires 15 and 16 are covered with a plastic material designated by reference numeral 17, the coating 17 being so applied that a smooth outwardly exterior result will be obtained in place of figure 8 cross section of Fig. 2. Those skilled in the art will appreciate that the coating which is applied to hold the wires covered may take many forms and that my invention must not be considered as limited to the particular forms shown in this application.

In Fig. 4 I illustrate the ends 15a and 16a of the wires 15 and 16 of Fig. 3, bent in the form of a V, for insertion into the calyx of a flower. This form of insertion may be desirable frequently in place of the insertion illustrated in Fig. 1.

I now claim:

1. In a flower holder, a pair of metal wires, a plastic coating formed about said wires and holding said wires assembled whereby to form a single strand which resembles the stem of a flower, the ends of the wires of said strand being adapted for separation and entry in spaced relation into the calyx of a flower, and said wires being of sufficient stiffness to enter the calyx by the piercing thereof and to hold the shapes into which they are bent.

2. In a flower holder, a pair of wires of sufficient stiffness to enter the calyx of a flower by the piercing thereof and thereafter to hold the shapes into which they are bent, a plastic coating about each of said wires holding said coated wires assembled in the form of a single strand that simulates the stem of a flower, the end of one of said wires being adapted to penetrate longitudinally through the said calyx, and the end of the other wire extending through said calyx to hold it on the first wire.

SAMUEL ZUCKERMAN.